Aug. 12, 1969  B. I. SCHEUER  3,460,254
DENTAL METHODS AND DEVICES
Filed May 9, 1967

INVENTOR.
BERNARD I. SCHEUER
BY
Rachenbach & Siegel
ATTORNEYS

United States Patent Office 3,460,254
Patented Aug. 12, 1969

3,460,254
DENTAL METHODS AND DEVICES
Bernard I. Scheuer, 25 Walnut Drive,
Tenafly, N.J. 07670
Filed May 9, 1967, Ser. No. 637,227
Int. Cl. A61c 7/00
U.S. Cl. 32—14                          22 Claims

ABSTRACT OF THE DISCLOSURE

The method and apparatus of securing dental devices on teeth by means of a partial vacuum. A dental device is provided having a recess extending inwardly so that when the device is positioned on the tooth surface a chamber is defined between the device and the tooth surface. The chamber is then partially evacuated enabling external atmospheric air pressure to securely hold the device on the tooth surface. A valve is provided to permit maintenance of the evacuated condition within the chamber.

---

This invention pertains generally to methods and devices for use in dentistry, and, more particularly, to methods for securing dental devices to teeth temporarily or permanently by the application of atmospheric air pressure thereto and to dental devices for use in the practice of such method.

It is a primary object of the present invention to provide methods of securing dental devices to teeth, either temporarily or permanently.

Another primary object of the present invention, in addition to the foregoing object, is to provide dental devices adapted to be secured to teeth, either temporarily or permanently, by the use of atmospheric air pressure.

Another primary object of the present invention, in addition to each of the foregoing objects, is to provide methods and devices for use in dentistry which permit the use of a partial vacuum within a hollow area adjacent a tooth for the purpose of attaching various appliances to teeth.

Yet another primary object of the present invention, in addition to each of the foregoing objects, is to provide methods and apparatus for producing and maintaining a partial vacuum between a subjacent tooth surface to maintain a dental device secured thereto, either temporarily or permanently.

It is also a primary object of the present invention, in addition to each of the foregoing objects, to provide methods and apparatus for improving the adhesion of substantially any dental device to a tooth or teeth that would normally be attached thereto with a dental cement.

Another and yet still further primary object of the present invention, in addition to each of the foregoing objects, is to provide novel methods and devices for retaining artificial teeth either temporarily or permanently.

A still further primary object of the present invention, in addition to each of the foregoing objects, is to provide novel methods and apparatus for splinting teeth to each other for periodontal stability.

Another and yet still further primary object of the present invention, in addition to each of the foregoing objects, is to provide methods and apparatus for attaching dental appliances or devices to teeth for immobilization thereof, such as in surgical procedures for fractures.

It is also a primary object of the present invention, in addition to each of the foregoing objects, to provide methods and apparatus for attaching various appliances or devices for moving teeth, such as in orthodontia.

A still further primary object of the present invention, in addition to each of the foregoing objects, is to provide dental appliances or devices with a generally resilient peripherally extending portion adapted to engage a subjacent tooth surface.

Yet still another primary object of the present invention, in addition to each of the foregoing objects, is to provide dental appliances or devices with a hollow recess, conduit means extending outwardly of the recess and valve means disposed within the conduit means to enable the recess to be at least partially evacuated.

In addition to each of the foregoing objects, it is yet another primary object of the present invention to provide novel methods, apparatus and means for evacuating a hollow recess to enable atmospheric air pressure to retain and secure dental appliances or devices to teeth, either temporarily or permanently.

The invention resides in improved methods of dentistry and in the combination, construction, arrangment and disposition of the various component parts and elements incorporated in improved dental devices, appliances or apparatus constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Figure 1:
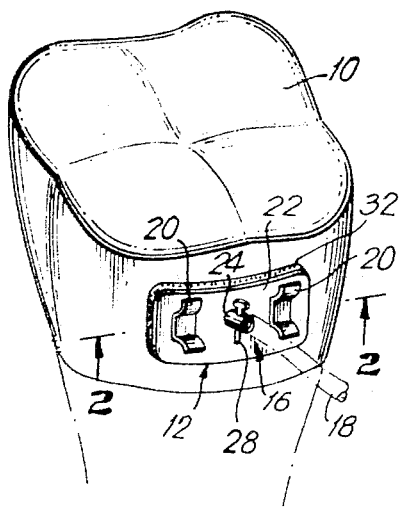
FIG. 1 is an enlarged isometric view of a tooth having affixed thereto a dental device or appliance constructed in accordance with the principles of the present invention.
Figure 2:
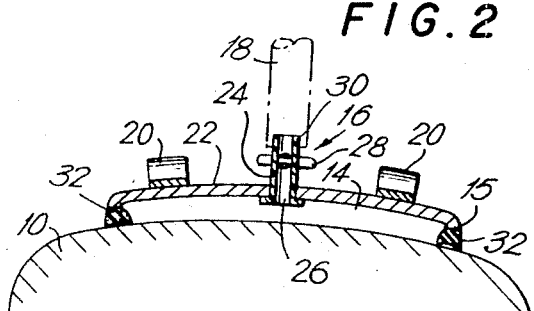
FIG. 2 is an enlarged cross-sectional view taken along line 2—2 of FIG. 1.

With reference now to the drawing, and particularly to FIGS. 1 and 2, thereof, there is shown and illustrated a tooth 10 to which there is applied an improved dental device or appliance constructed in accordance with the principles of the present invention and designated generally by the reference character 12. The device 12 is so constructed and arranged as to define a hollow recess 14 adapted to be disposed adjacent the surface of the tooth 10. The device 12 is further provided with means, such as a conduit and a valve assembly 16 for enabling the recess 14 to be at least partially evacuated, for example, by means of a flexible conduit 18 connected with a suction device, not shown, so that atmospheric air pressure acting upon the outer surfaces of the device 12 will secure and retain the device 12 positioned as desired relative to the tooth 10.

The device 12 may be so constructed and arranged as to be similar in general form and function to substantially any dental device or appliance adapted to be secured to a tooth, such as orthodontic brackets, tubes, lugs, buttons, hooks, eyelets, or the like. For example, by way of illustration only, the device 12 comprises a plurality of edgewise brackets 20 mounted upon a plate 22, as by soldering, welding, adhesive joining, screws, or in substantially any other well-known manner. The brackets 20 and the plate 22 may be fabricated of substantially any material, such as plastic, metal, or a combination thereof, or, the brackets 20 and the plate 22 may be integrally formed and may comprise similar or dissimilar materials.

The conduit and valve means 16 may, for example, comprise a conduit member 24 provided with a bore 26 extending therethrough into fluid communication with the chamber or recess 14 and a valve member 28 structurally and operatively associated with the conduit member 24 to selectively permit airflow through the passage or bore 26 or to preclude the passage of air therethrough, as shown. The conduit member 24 is structurally associated with the plate 22 in any desired manner, for example, by means of screw threads, flanges, welding, soldering, adhesive bonding, or the like. Preferably, the conduit member 24 extends outwardly of the valve member 28 to provide an end portion 30 with which the flexible conduit 18 may be removably associated.

As an aid in maintaining sealing contact between the periphery of the plate 22 and the surface of the tooth 10, the device or appliance 12 may further comprise a generally peripherally extending resilient seal member 32, fabricated, for example, of rubber, plastic, or the like. However, it is to be understood, that the plate 22 may itself be configured, constructed and arranged to seat directly upon the surface of the tooth 10, as by a lip 15.

Accordingly, upon evacuation of the hollow chamber or recess 14 by means of a vacuum pump, suction device, or the like, through the passage or bore 26 of the conduit member 24 outside atmospheric air pressure will be effective to secure the device or appliance 12 on the tooth 10, whereupon the valve member 28 may be moved to the closed position thereof to preclude airflow through the passage or bore 26 enabling the device or appliance 12 to remain positioned and secured upon the surface of the tooth 10 either temporarily or permanently even after the removal of the flexible conduit 18 from association therewith. Furthermore, if desired, an adhesive, such as a dental cement, or the like, may be disposed between the plate 22 or the seals 32 and the tooth 10, to reinforce the securement of the device or apparatus 12 to the tooth 10. Furthermore, such an adhesive may be utilized as the primary means of attachment and securement for the device or appliance 12, the atmospheric air pressure being utilized to securely position and hold the device or appliance 12 in position while the adhesive or cement sets.

As hereinbefore pointed out, the device or apparatus 12 hereinabove described, disclosed, illustrated and shown is particularly adapted to enable the ready removal from associatation with the tooth 10, the device or appliance 12 comprising the valve member 28 enabling the admission of atmospheric air to the hollow chamber or recess 14 to effect such release. If desired, the valve member 28 may comprise a one-way or check valve, enabling the evacuation of air from the chamber or recess 14 while precluding the admission of atmospheric air thereto.

Figure 3:
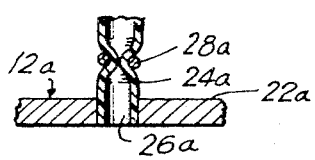
FIG. 3 is a partial cross-sectional view of another dental device constructed in accordance with the principles of the present invention.

Moreover, and with reference now to FIG. 3, wherein like reference characters are utilized, the reference characters having the suffix a, there is shown and illustrated another device or applicance 12a comprising a plate 22a and conduit means 24a adapted to be pinched or deformed, for example, by means of a clamp or clamp ring 28a so that after the chamber or recess has been evacuated, the conduit member 24a may be deformed by the clamp 28a to seal off or close the conduit passage or bore 26a, as shown. In the device or appliance 12a the conduit member 24a may comprise either a resilient member, such as a length of rubber or plastic tubing, or, may comprise a plastic member, such as a soft metal tube. Likewise, the clamp means 28a may comprise a clamp capable of being selectively opened and closed, or may comprise a metal, plastic, or rubber ring which will either through elastic action close the conduit member 24a or which may be deformed, for example, by means of a pair of pliers, or the like, to close the passage or bore 26a. In all other respects, the device or appliance 12a may be substantially identical with the device or appliance 12 heretofore described.

Figure 4:
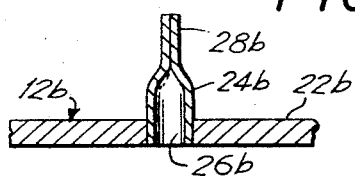
FIG. 4 is an enlarged partial cross-sectional view similar to FIG. 3 illustrating yet another dental device constructed in accordance with the principles of the present invention.

Similarly, and with reference particularly to FIG. 4, wherein like reference characters are utilized to designate like parts, the reference characters having the suffix b, the conduit member 24b secured with the plate 22b may be fabricated of a plastic material, such as a relatively soft metal adapted to have the passage or bore 26b thereof closed off by physically squeezing the sides of the conduit member 24b together, as with a pair of pliers, or the like, to form a flat portion 28b. The sides of the flat portion 28b may be merely mechanically engaged to seal the passage 26b or, for example, sufficient pressure may be utilized in forming the flattened portion 28b to "cold weld" the adjacent sides of the flattened portion 28b together.

It has been previously pointed out that a one-way or check valve type arrangement may be utilized to close and seal off the passage extending through the conduit member. Such check valve may, for example, comprise substantially any type of check valve arrangement, such as a flap valve, a ball and seat valve, or the like. Similarly, the valve means may comprise a valve member adapted to be manually unseated by the insertion of a hollow needle, or the like, the valve member being adapted to be retained in the closed off position thereof after evacuation by means of the external air pressure.

Figure 5:
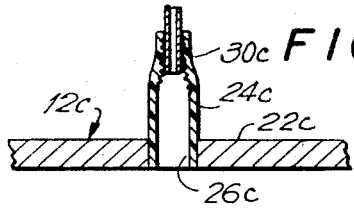
FIG. 5 is a cross-sectional view, similar to the preceding figures illustrating a further dental device constructed in accordance with the principles of the present invention and showing one step in the method of utilization thereof.
Figure 6:
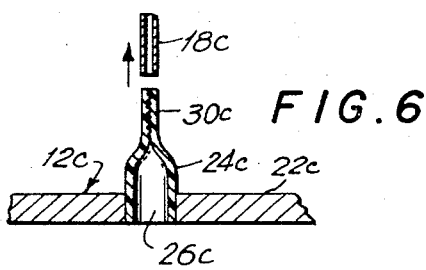
FIG. 6 is a view of the device of the preceding figure showing a further step in the utilization thereof.

For example, and with reference now to FIGS. 5 and 6, there is shown and illustrated another dental appliance or device 12c comprising the plate member 22c and a conduit member 24c, like reference characters being utilized for like parts as previously utilized, the reference characters being provided with the suffix c. The conduit member 24c is fabricated to comprise at least a resilient portion 30c fabricated of rubber, plastic, or the like and so constituted and arranged as to assume a position closing the passage or bore 26c when in the unstressed or normal position thereof, that is, to the configuration illustrated in FIG. 6, or the like. As an aid in maintaining an airtight seal, the internal surfaces of the resilient end portion 30c may be serrated, or the like, as shown. The hollow or recess of the device or appliance 12c may be evacuated of a conduit member 18c attached to a suction or vacuum pump, or the like. Upon removal of the conduit member 18c from engagement with the end portion 30c of the conduit member 24c, the resilient end portion 30c of the conduit member 24c will return to its normal position, sealing off the passageway 26c, the external air pressure being effective to additionally bias or stress the resilient end portion 30c to the sealed position thereof. For convenience, the conduit member 18c may be preassembled with the conduit member 24c, as shown in FIG. 5 and be adapted to be readily removed therefrom following evacuation.

Figure 7:
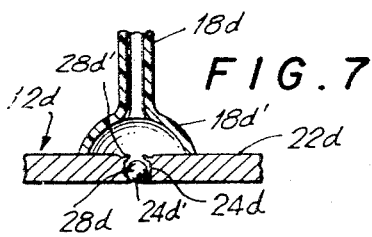
FIG. 7 is a cross-sectional view similar to the preceding figures illustrating still another dental device constructed in accordance with the principles of the present invention.

In each of the embodiments of the invention shown in FIGS. 1–6, the valve means has been associated with the conduit member 24, 24a, 24b, or 24c structurally, operatively associated with the plate member 22, 22a, 22b, or 22c, respectively. It is to be understood, however, that the presence or absence of such a conduit member is not necessary to a practice of the present invention, and in fact, such conduit member may be dispensed with entirely, or, may be made removable from the plate member after evacuation. For example, and with reference now to FIG. 7, there is shown and illustrated a modification or embodiment of dental device or appliance 12d constructed in accordance with the principles of the present invention wherein the plate 22d is provided with a bore 24d configured to define a restricted portion or seat 24d'. A ball check valve member 28d is disposed within the bore 24d and to be retained therewithin, as by means of staking 28d', enabling the ball memer 28d to reciprocate within the bore 24d into and out of engagement with the generally conical seat 24d'. The flexible conduit 18d may be provided with an outwardly belled portion 18d' adapted to engage the outer surface of the plate member 22d generally radially outwardly of the bore or passage 24d, as shown. Hence, the hollow or chamber within the device 12d may be evacuated through the bore or passage 24d, the belled portion 18d' and the flexible conduit 18d, the air flowing past the ball check member 28d. Upon removal of the belled portion 18d' from engagement with the outer surface of the plate 22d, external air pressure will cause the ball check member 28d to sealingly engage the generally conical seat 24d' to preclude the entrance of atmospheric air to the evacuated hollow or recess. If desired, a spring or other biasing means may be provided to bias the ball check member 28d towards engagement with the seat 24d'. Furthermore, as an aid in releasing the belled portion 18d' from engagement with the plate 22d, a bleed valve, or the like, not shown, may be provided for bleeding external atmospheric air into the interior of the flexible conduit 18d and the belled portion 18d' thereof after evacuation of the hollow or recess beneath the plate 22d.

Figure 8:
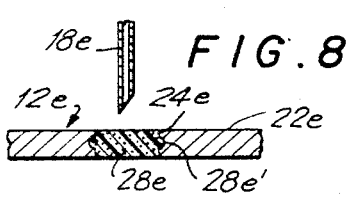
FIG. 8 is a cross-sectional view similar to the preceding figures illustrating a yet further dental device constructed in accordance with the principles of the present invention.
Figure 9:
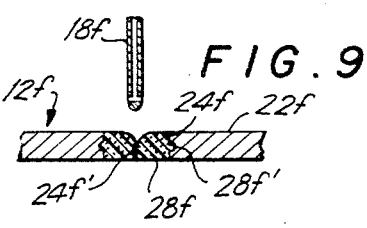
FIG. 9 is a cross-sectional view similar to the preceding figures illustrating another and still further dental device constructed in accordance with the principles of the present invention.

With particular reference now to FIGS. 8 and 9, dental devices or appliances 12e and 12f, repectively, may be constructed in accordance with the principles of the present invention by providing a bore or apetrure 24e or 24f extending through the plate 22e or 22f, respectively and providing an elastic plug 28e or 28f, respectively, entirely filling the bore or aperture 24e or 24f, respectively, and secured with the respective plate 22e or 22f by means of an adhesive, or the like, or by means of interlocking ridges 28e' or 28f', as shown. The hollow or recess of the devices or appliances 28e and 28f may be evacuated through the use of a piercing pin 18e similar to a hypodermic needle, as shown in FIG. 8, or, if the plug 28f is provided with a slit 24f', then the piercing pin 18f may be configured with a blunt end, similar to a conventional "football needle" as shown, for example, in FIG. 9.

In each of the embodiments or modifications of devices or appliances 12–12f, as hereinbefore pointed out, the plate 22–22f may be fabricated substantially of any desired material, such as metal, plastic, hard rubber, ceramic, or the like, provided with a soft or elastic sealing peripheral edge, or not so provided, as desired, and the devices or appliances may be further secured with the underlying tooth surfaces as by means of a dental cement, or the like. In each embodiment however, at least initial positioning and securement of the devices or appliances may be easily and quickly effectuated by evacuating the hollow or recess provided therein easily and quickly by means of a vacuum pump, suction machine, or the like. Furthermore, in each embodiment or modification, the external air pressure acting upon the device or appliance will be effective to maintain the device or appliance positioned and secured with the underlying tooth at least temporarily, and if desired, permanently, without requiring the provision of bands, crowns, or the like, and without requiring any cutting, grinding, drilling, or other modification or mutilation of the underlying tooth. Furthermore the provision of the flexible peripheral seal may be effective as a resilient of shock mounting to the device or appliance, further aiding in enabling the necessary dental, orthodontic, periodontal, or other procedures to be carried out with a maximum of patient comfort. It is to be further noted that while the invention has been described and illustrated in terms of embodiments wherein the dental device or appliance comprises a generally flat back plate having a bracket, or the like secured thereto, the instant invention is not to be deemed limited thereby, but such structure is for illustrative purposes only and the present invention is also suitable for use directly with the bracket 20, or the like, or with devices which do not comprise a sheet-type base, such as a crown, or the like.

What is claimed is:

1. Dental device for positioning on a tooth surface comprising, in combination, means defining a recess extending inwardly of said device adapted to be disposed on the tooth surface and means enabling at least partial evacuation and the maintenance of evacuated conditions within said recess, enabling external atmospheric air pressure to hold the device securely positioned on the tooth surface.

2. Dental device defined in claim 1 wherein said recess defining means comprises a lip extending generally peripherally of said recess.

3. Dental device defined in claim 1 wherein said recess defining means comprises a resilient seal extending generally peripherally of said recess.

4. Dental device defined in claim 3 wherein said recess defining means further comprising a lip extending generally peripherally of said recess.

5. Dental device defined in claim 3 wherein said resilient seal comprises an adhesive.

6. Dental device defined in claim 1 wherein said recess defining means comprises a substantially flat plate and a lip extending generally peripherally therefrom.

7. Dental device defined in claim 1 wherein said evacuation enabling means comprises conduit means.

8. Dental device defined in claim 7 wherein said evacuation enabling means further comprises valve means disposed relative to said conduit means.

9. Dental device defined in claim 7 wherein said conduit means is fabricated of a deformable material adapted to be manually deformed between a flow-enabling configuration and a flow-precluding configuration.

10. Dental device defined in claim 9 further comprising means for deforming said deformable material.

11. Dental device defined in claim 10 wherein said deforming means comprises clamp means adapted to be positioned externally of said conduit means.

12. Dental device defined in claim 10 wherein said deforming means comprises a hollow pin adapted to be inserted internally of said conduit means.

13. Dental device defined in claim 1 wherein said evacuation enabling means is defined by a bore providing communication with said recess.

14. Dental device defined in claim 13 wherein said evacuation enabling means further comprises a check valve arrangement disposed within the bore.

15. Dental device defined in claim 13 wherein said evacuation enabling means further comprises elastic plug means disposed within said bore.

16. Dental device defined in claim 15 wherein said evacuation means further comprises a hollow needle adapted to pierce said plug.

17. Dental device defined in claim 16 wherein said plug is provided with a slit adapted to enable passage therethrough of said hollow needle.

18. Attachment means for positioning a dental appliance on a tooth surface comprising, in combination, means defining a recess adapted to be positioned on a tooth surface and means enabling at least partial evacuation and maintenance of such evacuated condition within said recess, enabling outside atmospheric air pressure to securely hold the appliance positioned on the underlying tooth surface.

19. Attachment means defined in claim 18 wherein said recess defining means comprises a lip extending generally peripherally of said recess.

20. Attachment means defined in claim 18 wherein said recess defining means further comprises a resilient seal extending generally peripherally of said recess.

21. Method of securing a dental appliance on a tooth surface comprising, at least the steps of, positioning said appliance on the tooth surface, said appliance having a recess extending inwardly so as to define a chamber between said recess and said tooth surface, and at least partially evacuating said chamber so that outside air pressure holds the appliance positioned on the tooth surface.

22. Method defined in claim 21 further comprising, at least the additional step of, reinforcing the tooth surface to appliance juncture with an adhesive.

References Cited
UNITED STATES PATENTS 2,085,268 6/1937 Novel _____ 32—3
2,897,594 8/1959 Kopee et al. _____ 32—3

F. BARRY SHAY, Primary Examiner

C. R. WENTZEL, Assistant Examiner

U.S. Cl. X.R.

248—206, 362